Patented July 22, 1947

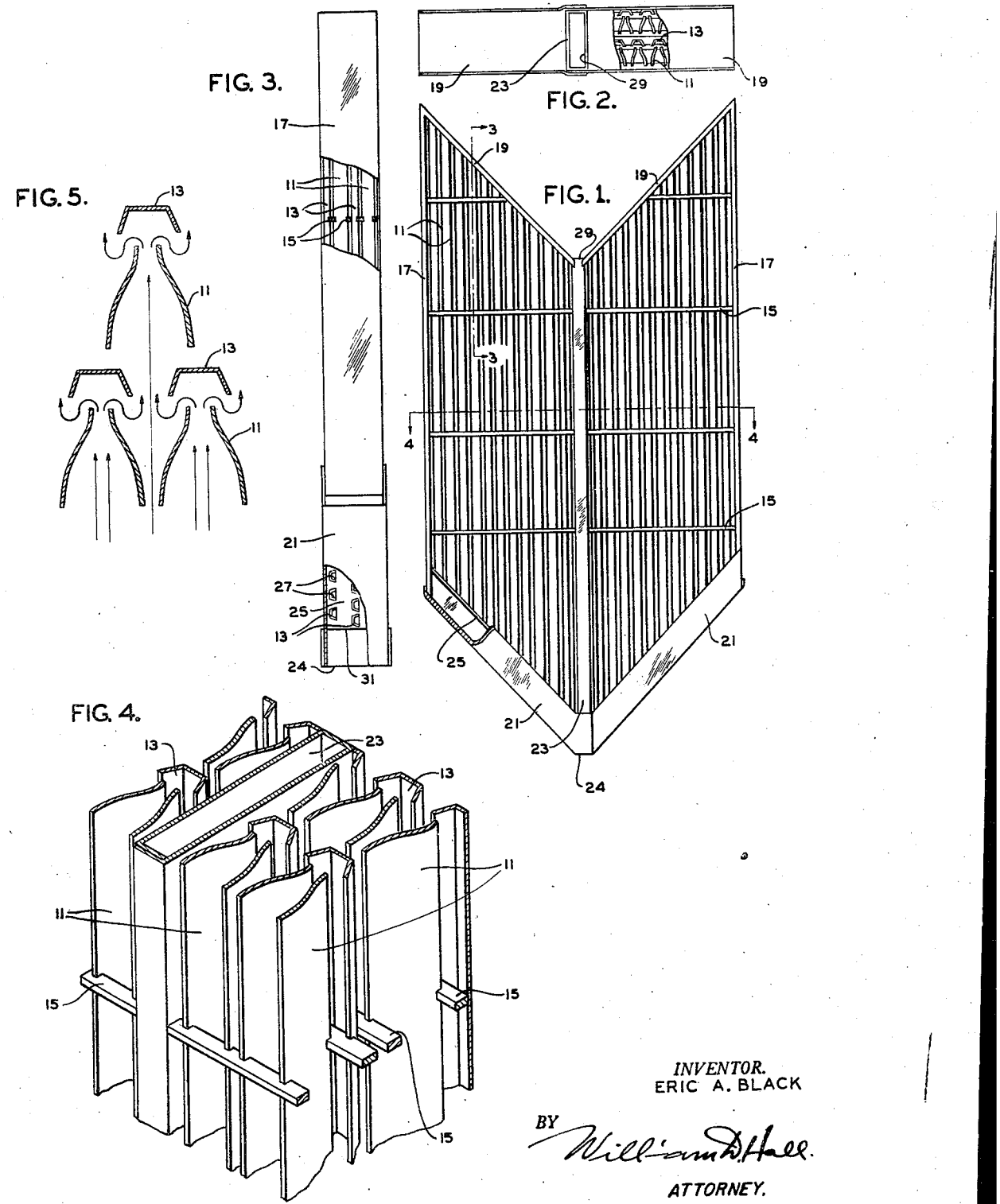

2,424,219

UNITED STATES PATENT OFFICE 2,424,219

SCREEN

Eric A. Black, Red Bank, N. J., assignor to the Government of the United States of America, as represented by the Secretary of War Application March 25, 1944, Serial No. 528,057

6 Claims. (Cl. 183—75)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to screens.

In desert country and other areas where the air is sand or dust laden, some air filtering means is advisable for living and working quarters and also to protect delicate machinery. It is, therefore, an object of the present invention to provide a filtering screen which will pass a maximum of air while freeing it from sand and dust.

In some instances, such filtering screens are needed to protect personnel or equipment aboard a motor vehicle. Hence, it is a further object hereof to produce a filtering screen which is a compact and sturdy unit, having no moving parts, and which will take the vibrations and shocks incident to vehicular use.

It is another object of my invention to provide such a filter as a unitary structure so that it may be used alone or several such units may be combined, as dictated by the requirements.

It is still another object to provide an air filtering means which is relatively simple and inexpensive to manufacture and which may be made up, if desired, entirely of sheet metal or other suitable material in sheet form, and which will require no expensive or complicated parts.

Still another object of this invention is to provide a filtering screen which will not clog, so as to require means for freeing it from accumulations of sand and dust.

For a better understanding of my invention and of other and further objects thereof, reference is made to the following description of a typical embodiment thereof and to the accompanying drawings, the scope of the invention being pointed out in the appended claims.

In the drawings,

Figure 1 is a front elevation of a filter screen embodying my invention, wherein part of the trough is broken away to expose its interior;

Figure 2 is a plan view of Figure 1, partly broken away to expose the filtering means;

Figure 3 is a left side view of Figure 1, wherein part of the trough is broken away to show the openings in the upper plate of the trough through which sand is discharged by the filtering means, and part of the upper portion of the screen is broken away and sectioned along the line 3—3 of Figure 1;

Figure 4 is a fragmentary perspective view of my screen, horizontally sectioned along the line 4—4 of Figure 1, wherein the filtering means and the channel box or conduit are shown; and Figure 5 is a fragmentary horizontal section, along the line 4—4 of Figure 1, wherein the arrows indicate generally the paths taken by air passing through the screen.

The embodiment of my filter screen, shown in the drawings, comprises filtering means consisting of a plurality of vanes or baffle plates 11 and channels 13. Said vanes 11 and channels 13 are arranged in two banks, one behind the other. Each vane 11 is a vertically disposed elongated strip of sheet metal which, in horizontal cross section, has the configuration of a reverse curve. As may be seen in Figures 4 and 5, the vanes 11, within each bank, comprise pairs which converge, funnel-like, toward the rear. Each such funnel-like pair of vanes 11 has behind it a vertically disposed channel 13 of sheet metal which, in vertical cross section, forms a wide mouthed U. The funnel-like pairs of vanes 11 of the two banks are staggered, so that the funnel-like pairs of the rear bank straddle the spaces intervening between the pairs of the front bank.

Said vanes 11 and channels 13 are retained and supported by several sets of horizontally disposed, notched rods 15, and a frame. The frame comprises two vertically disposed side members 17, the two top members 19, two troughs 21 and a vertically disposed central conduit or channel box 23. The side members 17 and top members 19 are sheet metal, bent over slightly at the front and back. The two top members 19 are angularly disposed so as to form a V and the two troughs 21 form a similar V. The lower end or apex of the V, formed by the two troughs 21, is provided with a discharge opening 24. The top members 19 cover the upper ends of the vanes 11 and the channels 13.

Each trough 21 comprises an enclosed rectangular passageway. The upper plate 25 (Figures 1 and 3) of each trough 21 has a small trapezoidally shaped opening 27 at the foot of each of the channels 13. The channel box 23 is a rectangular conduit, having an inlet opening 29 at its upper end and a discharge opening 31 at its lower end. The discharge opening 31 of the channel box 23 discharges into the junction at the apex of the two troughs 21. The discharge opening 24 at the apex of the V formed by the troughs 21 is in register with and directly below the discharge opening 31 of the channel box 23.

The filter screen aforesaid may be set as a unit into a wall of a building, a vehicle, etc. In operation, sand and dust laden air will blow against my filter screen from the front, or outside. Some of the air will flow through the funnel-like passages between the vanes 11 of the pairs of vanes of the front bank and will be directed toward the channels 13 associated therewith. The balance of the air will flow through the relatively narrow air passages between adjacent funnel-like pairs of vanes 11 of the front bank, and will flow through the funnel-like passages between the vanes 11 of the pairs of vanes of the rear bank and thence toward the rear channels 13.

As may be seen in Figure 5, the dust or sand laden air directed toward either the front or rear channels will then be forced sharply to the left and the right. The speed of the air will be such that, although the air itself will be able to make the sharp turns and go on, the particles of sand and dust, having greater inertia, will strike against the channels 13, and will drop down said channels and through the openings 27 in the plates 25 and into the troughs 21. The sand and dust will then slide down the obliquely disposed troughs 21 and will drop out of the discharge opening 24 at the apex of the troughs.

A chute (not shown) may be provided to convey sand and dust downward from the discharge opening 24. Another arrangement (not shown), which I find preferable, is to provide such a chute in the form of an elongated enclosed conduit with a valve at its lower end. The valve remains shut until a sufficient weight of sand had accumulated in the chute above it, and it then opens to discharge the accumulated sand. This avoids the possibility of any sand or dust being blown back up into the filter screen through the discharge opening 24. The valve need be no more than a plate across the chute, hinged at on side and held in closed position by a spring. It will open when a sufficient weight of sand or dust overcomes the spring tension and it will then close again.

In territories where a large amount of extremely fine dust is found, best results are obtained if the vanes 11 and the channels 13 associated therewith are relatively tightly coupled so that the air paths just beyond the funnel-like passages make particularly sharp turns.

Where desired, two or more of my filter screens may be used, one above the other. When so used, the V shaped trough of one screen nests into the V shaped top of the screen below it and the discharge opening 24 of one screen is directly over the opening 29 at the top of the channel box 23 of the screen below. Thus, all sand and dust accumulated in the upper screens drops through the channel boxes 23 of the lower screens and out of the discharge opening 24 at the lower end of the bottom screen. By this construction the screens can be manufactured in easily handled sizes and then any desired number of them may be used, one above the other.

For some types of installations I use a variation of the embodiment described above. The filter screen in such case comprises a unit which is either the left half or the right half of the embodiment disclosed above. A conduit such as the channel box 23, however, is retained in either case. Thus, the screen takes the form of a parallelogram having an obliquely disposed top member similar to either half of the V shaped member 19 mentioned above and an obliquely disposed trough, such as one half of the V shaped trough 21 aforesaid, which is parallel to the top member. The two sides of the screen are parallel to each other and vertically disposed, one side being similar to the side member 17 previously disclosed and the other side comprising a channel box similar to the channel box 23 previously disclosed. The operation of this modified embodiment is similar to the V shaped screen aforesaid. These screens may also be stacked one above the other as in the case of the V shaped screen.

I have found that in some cases a combination of my filter screen as aforesaid, with another filter disposed behind it across the back, works out very satisfactorily. This second filter may be made up of one or more layers of fine filtering cloth or of other filtering means suited primarily for fine dust. When so used the vanes 11 and channels 13 of my screen will be relatively loosely coupled so as to remove primarily the larger particles of sand. The fine dust particles, however, will be allowed to get through the screen, but will be trapped by the second filter of filtering cloth or the like. In this combination the larger particles of sand, which might be likely to cut into the filtering cloth, are stopped before reaching it.

My filter screen may also be used for separating moisture particles from air or other gases, for separating oily particles from steam, or for other separating operations requisite to certain manufacturing processes. Where used for air filtering, it will also keep water particles from passing through it during periods of damp weather.

It is to be noted that, although my filter screen or separator will operate if the inner faces of the vanes are flat, converging surfaces, I have found that vanes which have reverse curves defining their inner surfaces, such as shown in the drawings, are more effective. When the vanes are so shaped, the funnel-like passage between each pair of vanes takes the form of an injector tube. This imparts a most efficient, almost frictionless, increase in velocity to the air flowing through it. This increased velocity is necessary to obtain sufficient centrifugal force so that the particles of sand (or moisture, or oil) are thrown off when the air has passed beyond the vanes. I would point out that immediately beyond each pair of vanes 11 there is an open space. Air, which has passed through the funnel-like passages will make the sharp turns to the left and right already described. Within each channel 13, and particularly along the central portion of the rear wall thereof, will be a pocket of air practically unaffected by the streams of air flowing to both sides of it. Particles of sand (or moisture, or oil) will reach this pocket and will drop downward without interference from the said streams of air.

Although I have herein described certain embodiments of my invention, it is to be understood that my invention is not to be limited thereto.

I claim:

1. A filter screen to remove sand or dust from air passing through it comprising a top member and a trough which are obliquely disposed and are parallel to each other, air filtering means disposed between the top member and the trough, the trough being receivable to sand or dust collected by the filtering means aforesaid, said trough having a discharge means at its lower end, a vertically disposed conduit for sand or dust open at both ends extending from the lower end of the top member aforesaid to the lower end of the trough aforesaid, whereby two or more of said filter screens may be disposed in abutting relationship one above the other and sand or dust collected in each screen above the lowermost screen may discharge through the conduit of each screen below it.

2. A filter screen to remove sand or dust from air passing through it comprising a V shaped top member and a V shaped trough, air filtering means disposed between the top member and the trough, said trough being receivable to sand or dust collected by the filtering means aforesaid, said trough having a discharge means at its lowest point, a vertically disposed conduit for sand or dust open at both ends extending from the apex of the top member aforesaid to the apex of the trough aforesaid, whereby two or more of said filter screens may be disposed in abutting relationship one above the other and sand or dust collected in each screen above the lowermost screen may discharge through the conduit of each screen below it.

3. A filtering means for a filter screen to remove sand or dust from air passing through said filtering means from front to rear comprising two vanes and a channel, the vanes being elongated and vertically disposed and converging toward the rear to form a funnel-like air passage between them, each vane, in horizontal cross section, having the configuration of a reverse curve, and each vane being made of thin material so as to present a thin leading edge to oncoming air, the channel being elongated and disposed vertically behind the funnel-like passage and having an inside surface shaped in cross section substantially like a wide mouthed U, said channel being positioned relatively closely behind the vanes so that sand or dust laden air passing through the funnel-like passage between said vanes is caused to increase its speed and the air is caused to make sharp turns and the sand or dust is caused to enter the said channel.

4. A filter screen to remove sand or dust from air passing through said screen from front to rear comprising two banks of filtering means, one bank disposed behind the other; each bank including a plurality of pairs of vanes and a plurality of channels; each vane being elongated and vertically disposed, and each vane being made of thin material so as to present a thin leading edge to oncoming air and having, in horizontal cross section, the configuration of a reverse curve, each pair of vanes being spaced from adjacent pairs to form relatively narrow air passages between the pairs, the vanes of each pair converging toward the rear to form a funnel-like air passage between said vanes; a channel disposed behind the funnel-like air passage of each pair of vanes, each such channel being elongated and vertically disposed and having an inside surface shaped in cross section substantially like a wide mouthed U; each channel positioned relatively closely behind the pair of vanes disposed in front of it so that sand or dust laden air passing through the funnel-like air passage between said vanes is caused to increase its speed, and the air is caused to make sharp turns, and the sand or dust is caused to enter the said channel; the pair of vanes of the two banks being staggered so that air passing through the relatively narrow air passages between adjacent pairs of vanes of the front bank is directed into the funnel-like passages of the pairs of vanes of the rear bank.

5. A filtering means for a filter screen to remove sand or dust from air passing through said filtering means from front to rear comprising two vanes and a channel, the vanes being elongated and vertically disposed and converging toward the rear to form a funnel-like air passage between them, each vane, in horizontal cross section, having the configuration of a reverse curve, and each vane being made of thin material so as to present a thin leading edge to oncoming air, and the channel being elongated and disposed vertically behind the funnel-like passage and having an inside surface shaped in cross section substantially like a wide mouthed U, so that sand or dust laden air passing through the funnel-like passage between said vanes is caused to increase its speed and the air is caused to make sharp turns and the sand or dust is caused to enter said channel.

6. A filter screen to remove sand or dust from air passing through said screen from front to rear comprising two banks of filtering means, one bank disposed behind the other; each bank including a plurality of pairs of vanes and a plurality of channels; each vane being elongated and vertically disposed, and each vane being made of thin material so as to present a thin leading edge to oncoming air and having, in horizontal cross section, the configuration of a reverse curve, each pair of vanes being spaced from adjacent pairs to form relatively narrow air passages between adjacent pairs, the vanes of each pair converging toward the rear to form a funnel-like air passage between said vanes; and a channel disposed behind the funnel-like air passage of each pair of vanes, each such channel being elongated and vertically disposed and having an inside surface shaped in cross section substantially like a wide mouthed U; so that sand or dust laden air passing through the funnel-like air passage between said vanes is caused to increase its speed, and the air is caused to make sharp turns, and the sand or dust is caused to enter the said channel; the pair of vanes of the two banks being staggered so that air passing through the relatively narrow air passages between adjacent pairs of vanes of the front bank is directed into the funnel-like passages of the pairs of vanes of the rear bank.

ERIC A. BLACK.

REFERENCES CITED

The following references are of record in the file of this patent:

UNITED STATES PATENTS

| Number | Name | Date |
| --- | --- | --- |
| 1,825,274 | Leach | Sept. 29, 1931 |
| 877,460 | Brunner et al. | Jan. 21, 1908 |
| 1,521,575 | Wittemeier | Dec. 30, 1924 |
| 801,211 | Butzow | Oct. 10, 1905 |

FOREIGN PATENTS

| Number | Country | Date |
| --- | --- | --- |
| 531,515 | France | Jan. 16, 1922 |
| 19,303 | Switzerland | Apr. 29, 1899 |